United States Patent
Sherrer et al.

(10) Patent No.: US 6,501,619 B1
(45) Date of Patent: Dec. 31, 2002

(54) INDUCTIVE MAGNETIC RECORDING HEAD HAVING INCLINED MAGNETIC READ/WRITE POLE AND METHOD OF MAKING SAME

(75) Inventors: David W. Sherrer, Radford, VA (US); Noel Heiks, Radford, VA (US); Dan Steinberg, Radford, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/560,418

(22) Filed: Apr. 27, 2000

(51) Int. Cl.⁷ .............................................. G11B 5/147
(52) U.S. Cl. ...................................................... 360/126
(58) Field of Search ................................ 360/126, 121, 360/120, 103, 104, 125, 127, 117, 246.1, 246.2; 29/603, 603.13

(56) References Cited

U.S. PATENT DOCUMENTS

| | | | |
|---|---|---|---|
| 4,949,207 A | | 8/1990 | Lazzari ......................... 360/119 |
| 4,951,166 A | * | 8/1990 | Schewe ......................... 360/126 |
| 5,041,932 A | * | 8/1991 | Hamilton ....................... 360/126 |
| 5,062,196 A | | 11/1991 | Deroux-Dauphin ........... 29/603 |
| 5,090,111 A | | 2/1992 | Lazzari ......................... 29/603 |
| 5,163,218 A | * | 11/1992 | Hamilton ....................... 29/603 |
| 5,375,023 A | | 12/1994 | Ju et al. ....................... 360/119 |
| 5,452,165 A | | 9/1995 | Chen et al. ................... 360/126 |
| 5,454,158 A | * | 10/1995 | Fontana, Jr. et al. .......... 29/603 |
| 5,488,528 A | | 1/1996 | Chen et al. ................... 360/126 |
| 5,563,754 A | | 10/1996 | Gray et al. ................... 360/126 |
| 5,604,973 A | | 2/1997 | Gaud et al. .................. 29/603.15 |
| 5,655,286 A | * | 8/1997 | Jones, Jr. ...................... 29/603.13 |
| 5,673,163 A | * | 9/1997 | Cohen ............................ 360/126 |
| 6,236,538 B1 | * | 5/2001 | Yamada et al. ............... 360/126 |

* cited by examiner

Primary Examiner—William Korzuch
Assistant Examiner—Christopher R. Beacham
(74) Attorney, Agent, or Firm—Brown Rudnick Berlack Israels, LLP

(57) ABSTRACT

A thin film magnetic read/write head which has a return pole and a read/write pole adjacent to the return pole. The return pole has a vertical sidewall which has a predetermined height and is perpendicular to a substrate. An insulating layer is disposed on the sidewall between the return pole and read/write pole. The insulating layer thus defines a gap spacing between the return pole and read/write pole. The read/write pole comprises a magnetic material layer which is perpendicular to the substrate and adhered to the insulating layer. The thickness of the magnetic material layer determines the thickness of the read/write pole. The return pole and read/write pole have top surfaces which are coplanar. The plane defined by the top return pole surface is perpendicular to the magnetic material layer and parallel to the substrate. The read/write pole is magnetically coupled to a core layer which is magnetically coupled to a solenoidal winding of conductive material. The core layer is coupled to a base layer which is coupled to the return pole. The return pole and core layer are disposed on top of the base layer.

9 Claims, 13 Drawing Sheets

INDUCTIVE MAGNETIC RECORDING HEAD HAVING INCLINED MAGNETIC READ/WRITE POLE AND METHOD OF MAKING SAME

FIELD OF THE INVENTION

This invention relates generally to magnetic recording heads, and, more specifically, to magnetic recording heads used to store high density data in hard drives, tape drives and the like.

BACKGROUND OF THE INVENTION

Magnetic media is widely used for data storage. Hard drives, tape drives, and floppy disks are all examples of magnetic data storage devices.

Typically, the magnetic medium comprises a thin film of magnetic material which can have various magnetic orientations in different domains on the surface of the film. Magnetic data storage requires the use of a read/write head capable of writing the magnetic field orientations of the magnetic domains. Such writing is typically performed by a magnetic circuit having a small gap, with a conductive wire magnetically coupled with the magnetic circuit. The gap is placed in close proximity to the magnetic medium surface.

Data encoded on magnetic storage surfaces is typically arranged in parallel tracks. The distance between adjacent tracks (track pitch) is one important factor which determines the data storage capacity of a magnetic surface. For maximum storage capacity, it is desired to make the track pitch as close as possible. The minimum track pitch, however, is limited by the physical dimensions of the magnetic read/write head used. Therefore, for maximum data storage capacity on a given magnetic surface, it is desired to minimize the width of the read/write head.

Another concern in the design of read/write heads is the fabrication geometry. Many head designs require the substrate on which the head is formed be cleaved and the cleaved edge polished. This allows the thin films adhered to the substrate surface to be oriented perpendicular to the magnetic data storage surface. This necessitates additional polishing steps so that the cleaved substrate edge is smooth. An example of such a read/write head is described in U.S. Pat. No. 5,075,956 to Das.

Another problem with magnetic read/write heads is that it is often difficult to manufacture the read/write pole of the head such that its dimensions are well defined and accurate.

U.S. Pat. No. 5,486,963 to Jones discloses a magnetic read/write head which uses a solenoidal type coil. The completion of the magnetic circuit in Jones's head requires application of an additional vertical part of the pole piece to the polished edge of the cleaved substrate. This step renders Jones's head more complex to manufacture and requires the step of polishing the cleaved edge. Another disadvantage of Jones's head is that it requires that thin films be applied to the cleaved and polished edge.

U.S. Pat. No. 5,684,660 to Gray et al. discloses a magnetic read/write head which has a horizontal solenoidal structure and a vertical gap. Gray's head is complex to manufacture due to a large number of plating and etching steps and the large number of elements comprising the magnetic circuit. Gray's head also places the gap on top of the coil structure, which can be problematic because the coil structure is bumpy.

There exists a need for a sensitive magnetic read/write head which is simple to manufacture, which has a narrow geometry, and which has a read/write pole with well-defined dimensions.

OBJECTS AND ADVANTAGES OF THE INVENTION

Accordingly, it is a primary object of the present invention to provide a read/write head for magnetic data storage media that:

1) is simple to fabricate on planar substrates;
2) is narrow such that track pitch can be reduced;
3) does not require the substrate edge to be polished;
4) is sensitive to weak magnetic signals such that linear data density can be maximized;
5) enables a large number of heads to be planarized simultaneously;
6) requires a small amount of substrate surface area so that a large number can be manufactured on a single substrate.

These and other objects and advantages will be apparent upon reading the following description with reference to the drawings.

SUMMARY OF THE INVENTION

These objects and advantages are attained by a thin film magnetic head comprising a base layer of magnetic material disposed on top of a substrate with a first end of the base layer magnetically coupled to a first end of a core layer. The core layer is disposed on top of the base layer. An electrical conductor coil is wrapped around the core layer to form a solenoidal type coil. A return pole is disposed on top of a second end of the base layer and is magnetically coupled with the second end of the base layer. The return pole has a top return pole surface. A read/write pole is disposed adjacent to the return pole and is magnetically coupled with a second end of the core layer. The read/write pole has a top read/write pole surface which is coplanar with the top return pole surface. A layer of insulating material is disposed between the return pole and read/write pole. The insulating material defines a gap spacing between the return pole and read/write pole. The insulating layer is oriented at an inclined angle to the substrate. Preferably, the insulating layer is perpendicular to the substrate. The base layer, core layer, return pole and read/write pole comprise a magnetic material such as NiFe.

Preferably, the coil is electrically insulated from both the core layer and base layer. Also preferably, the surface area of the top return pole surface is greater than the surface area of the top read/write pole surface area.

The read/write pole and core layer preferably comprise a single, continuous layer of magnetic material. Also, the read/write pole and the core layer preferably have the same width. Preferably, the width of the read/write pole is narrower than the width of the return pole. The read/write pole can be surrounded on three sides by the return pole. In this case, the return pole is U-shaped.

Also, the head can be covered with a passivation layer which is preferably planarized to the plane defined by the top return pole surface and the top read/write pole surface.

In an alternative embodiment, the base layer is disposed in a groove in the substrate. The top surface of the base layer is flush with the top surface of the substrate. The groove can be a V-groove formed in a silicon substrate by an anisotropic etch.

An alternative embodiment of the present invention locates the coil around the core layer which is underneath a top layer which is made of magnetic material. The top layer is magnetically coupled to the read/write pole and the core layer is coupled to the return pole. The return pole and read/write pole are separated by an insulating layer which is oriented at an angle inclined with respect to the substrate. Preferably, the insulating layer is perpendicular to the substrate.

Preferably, the coil is electrically insulated from both the core layer and top layer. Also preferably, the surface area of the top return pole surface is greater then the surface area of the top read/write pole surface area. Preferably, the read/write pole and top layer comprise a single, continuous layer of magnetic material. The read/write pole and the top layer can have the same width. Preferably, the width of the read/write pole is narrower than the width of the return pole.

The read/write pole can be surrounded on three sides by the return pole. In this case, the return pole is U-shaped.

Also, the head can be covered with a passivation layer which is preferably planarized to the plane defined by the top return pole surface and the top read/write pole surface.

The present invention also includes a structure for a return pole and read/write pole. The return pole has a top return pole surface and a sidewall which has a predetermined height and is inclined with respect to a substrate. Preferably, the sidewall is perpendicular to the substrate. An insulating layer is disposed on the sidewall. The thickness of the insulating layer determines a gap spacing between the return pole and the read/write pole. The read/write pole comprises a magnetic material layer which is disposed on top of the insulating layer. The magnetic material layer is therefore parallel to the sidewall. A top return pole surface and a top read/write pole surface are coplanar and parallel with the substrate. The magnetic material layer has a thickness which is small compared to the height of the return pole sidewall. The plane defined by the top return pole surface cuts through the magnetic material layer. This assures that the thickness of the magnetic material layer determines the thickness of the read/write pole.

A method for making the return pole and read/write pole includes the step of producing a return pole which has a sidewall. The sidewall is preferably perpendicular to a substrate, but can also be inclined with respect to the substrate. The sidewall has a predetermined height. An insulating layer is deposited on the sidewall and a magnetic material layer is deposited on the insulating layer. The thickness of the magnetic material layer is less than the height of the sidewall. The return pole, insulating layer and magnetic material layer are then planarized to a plane parallel with the substrate which intersects the magnetic material layer and insulating layer. This assures that the read/write pole comprising the planarized magnetic material layer has a thickness which is determined by the magnetic material layer thickness. If the sidewall is perpendicular to the substrate, then the thickness of the magnetic material layer is equal to the thickness of the read/write pole.

DETAILED DESCRIPTION

Figure 1:
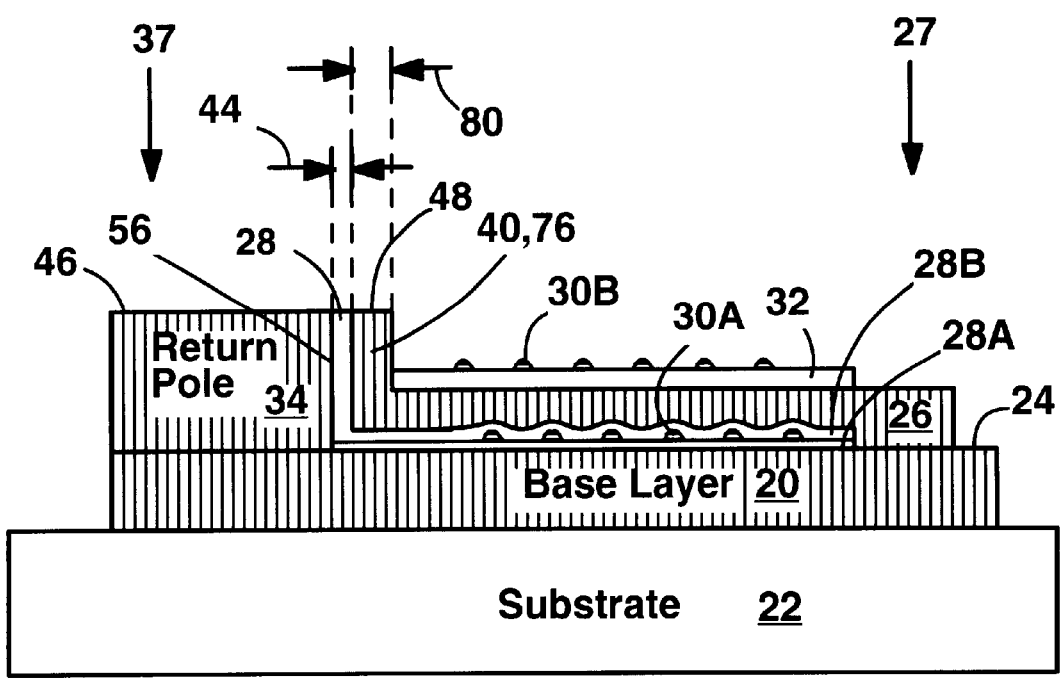
FIG. 1 is a cross sectional side view of the magnetic head according to the preferred embodiment of the present invention.

A preferred embodiment of the present invention is shown in the cross sectional side view of FIG. 1. A base layer 20 comprising ferromagnetic material is disposed on top of a flat substrate 22. The substrate 22 is preferably made of an electrical insulating material such as alumina, glass, ceramic or undoped silicon. The base layer 20 is preferably made of nickel-iron alloy, but can be any ferromagnetic material. The base layer 20 is preferably about 20–40 microns thick. A relatively thick base layer provides a low reluctance path for magnetic flux. A top surface 24 of the base layer 20 is preferably planar.

A core layer 26 is disposed on top of the base layer 20. The core layer 26 is made of a ferromagnetic material such as nickel-iron alloy. The core layer 26 and base layer 20 are magnetically coupled on a first end 27. Bottom and top insulating layers 28A, 28B are disposed between the core layer and base layer in regions outside the first end. The insulating layers 28A, 28B serve to electrically and magnetically insulate the base layer 20 and core layer 26 from one another. Also, the bottom insulating layer 28A electrically insulates a bottom half of coil 30A from the base layer 20. Top insulating layer 28B electrically insulates the bottom half of coil 30A from the core layer. Bottom and top insulating layers 28A, 28B can be considered to be a single insulating layer 28 in the region of the sidewall 56. The insulating layer 28 is made of a nonmagnetic (low permeability) insulating (high electrical resistance) material such as silicon dioxide, silicon nitride or alumina.

The coil 30A, 30B is made of a conductive material such as aluminum and is wrapped around the core layer 26. The coil 30 is therefore magnetically coupled with the core layer 26. The coil comprises the bottom half of coil 30A and a top half of coil 30B which are connected to form a solenoidal winding around the core layer 26. The coil 30 is oriented with an axis parallel with the substrate 22. In the cross sectional view of FIG. 1, the coil appears as bumps. Preferably, the coil 30 is electrically isolated from the core layer 26 and base layer 20. An upper insulating layer 32 provides electrical insulation between the top half of coil 30B and core layer 26.

A return pole 34 is disposed on top of the base layer 20 on a second end 37 of the base layer 20. The return pole is magnetically coupled to the second end 37 of the base layer 20. The return pole has a sidewall 56 which is oriented at an angle inclined with respect to the substrate 22. Preferably, the sidewall 56 is perpendicular to the substrate 22, as shown.

A read/write pole 40 made of ferromagnetic material is disposed adjacent to the return pole 34. The read/write pole 40 comprises a layer of magnetic material 76 which is parallel with the sidewall 56 and preferably perpendicular to the substrate 22. The read/write pole 40 has a predetermined thickness 80. The read/write pole 40 is magnetically coupled with the core layer 26. Preferably, the read/write pole 40 and core layer 26 comprise a single, continuous layer of magnetic material. The thickness of the magnetic material layer 76 which comprises the read/write pole 40 and core layer 26 is less than the height of the return pole sidewall 56. Also, the magnetic material layer 76 which comprises the read/write pole 40 is parallel with the sidewall 56.

The return pole 34 and read/write pole 40 are separated by the insulating layer 28. The insulating layer 28 defines a gap spacing 44 between the return pole 34 and read/write pole 40. The insulating layer 28 which determines the spacing between the return pole 34 and read/write pole can be one or both of the bottom and top insulating layers 28A, 28B.

The return pole 34 has a top return pole surface 46 which is coplanar with a top read/write pole surface 48. The top return pole surface 46 and top read/write pole surface 48 are parallel with the substrate 22 (this feature is optional).

Figure 2:
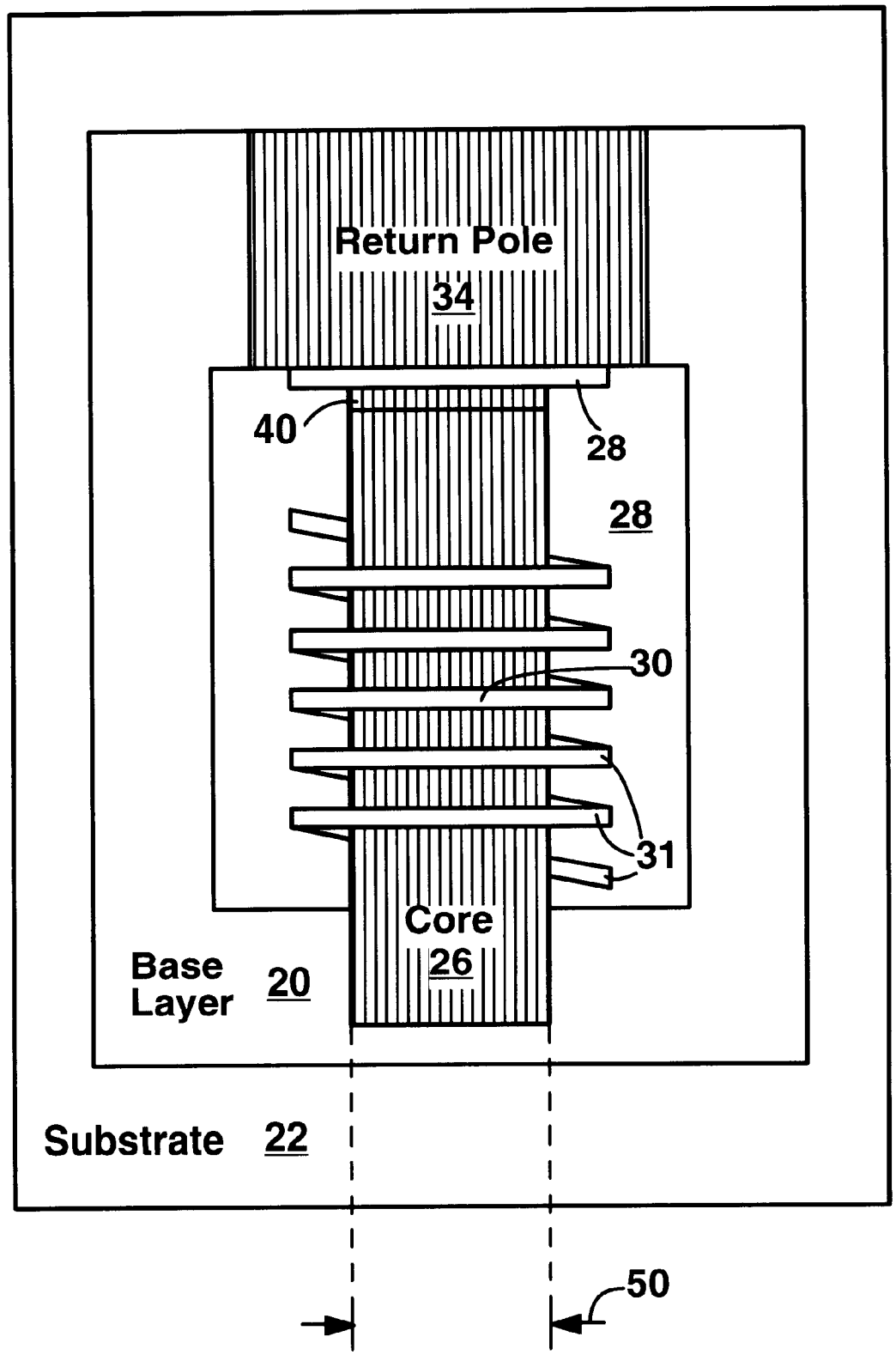
FIG. 2 is a top view of the magnetic head.

FIG. 2 shows a top view of the head. For clarity, the upper insulating layer 32 is not shown. The core layer 26 has a predetermined width 50 which is preferably equal to the width of the read/write pole 40. The read/write pole 40 may be narrower than the core layer 26, but this is not preferred because it is difficult to fabricate. Also preferably, the read/write pole 40 is narrower than the return pole 34, as shown.

Figure 3:
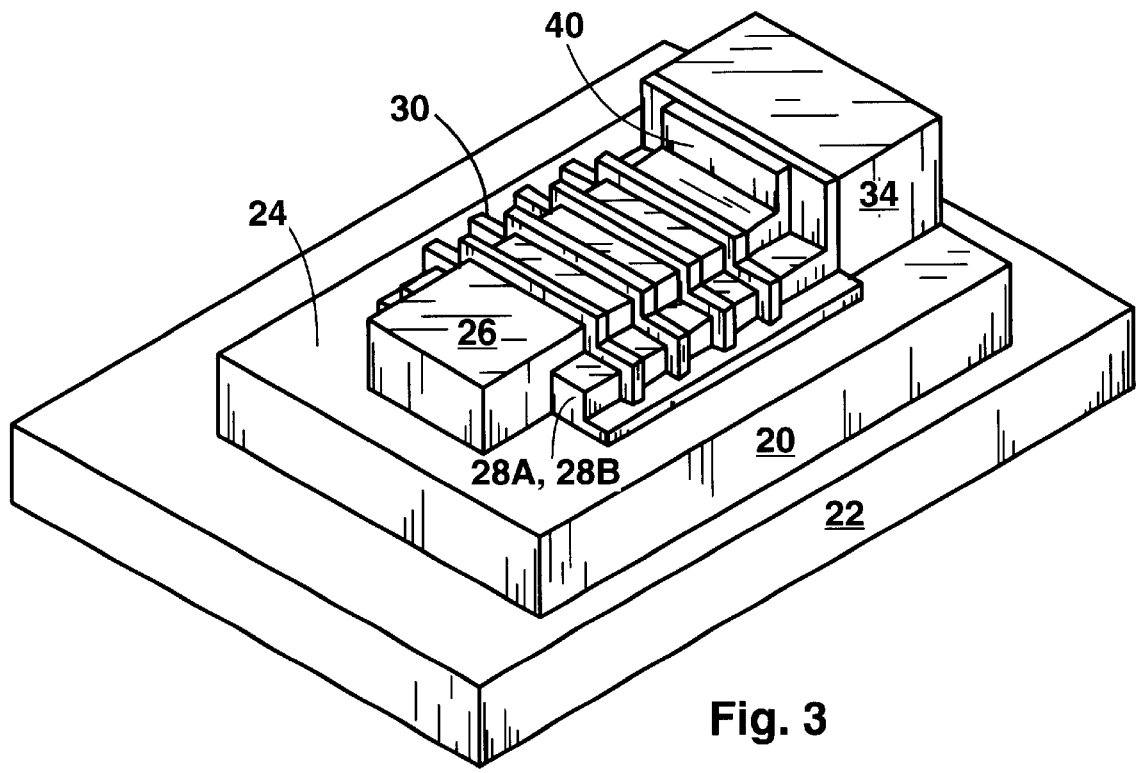
FIG. 3 is a tree-dimensional view of the magnetic head according to the preferred embodiment.

FIG. 3 shows a 3-dimensional perspective view of the head. For clarity, the upper insulating layer 32 has been omitted.

Figure 4:
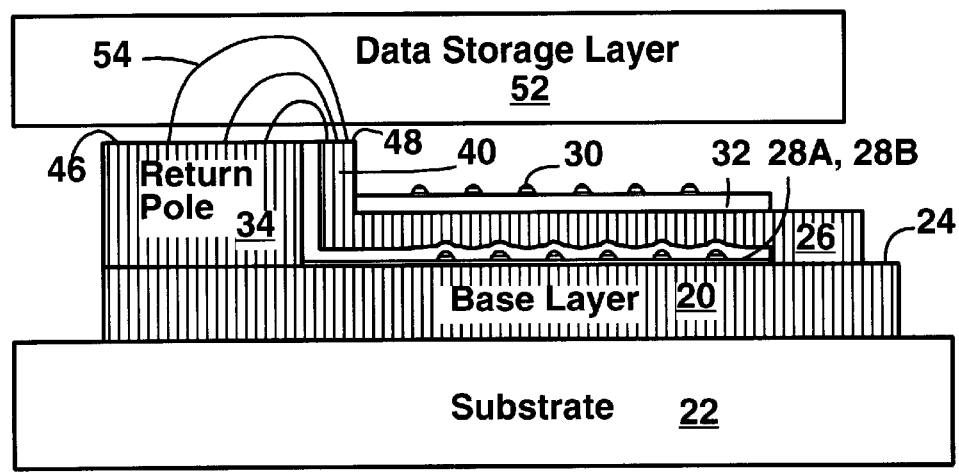
FIG. 4 is a side view of the magnetic head writing data onto a magnetic data storage medium.

FIG. 4 shows a side view of the present invention in operation writing to a magnetic data storage layer 52. The magnetic data storage layer 52 is disposed parallel with and in close proximity to top surfaces 46, 48. The core layer 26, base layer 20, return pole 34 and read/write pole 40 combined form a magnetic circuit with a gap between the return pole 34 and read/write pole 40. Energizing the coil 30 causes magnetic flux 54 to write onto the magnetic data storage layer 52. Magnetic flux lines 54 extend between the read/write pole and the return pole. The flux 54 has a higher density above the top read/write pole surface 48 than above the top return pole surface 46 due to the smaller size of the read/write pole 40.

Figure 5A:
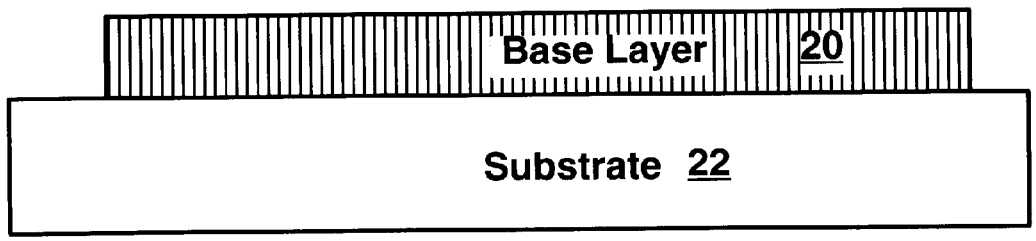
FIGS. 5A–5G illustrate the method of making the magnetic head according to a preferred embodiment of the present invention.

FIGS. 5A–5G show the steps in making the head of the present invention. The first step is shown in FIG. 5A. The base layer 20 is deposited and patterned on the substrate 22. The base layer 20 is made of a ferromagnetic material having a high magnetic permeability such as NiFe alloy. The base layer should be clean and flat to allow subsequent layers to adhere. It is well known in the art of thin film deposition and etching how to deposit and pattern ferromagnetic materials. For example, the base layer can be deposited using electroplating or sputtering techniques, patterned with resist and exposed to a wet chemical etch.

Figure 5B:
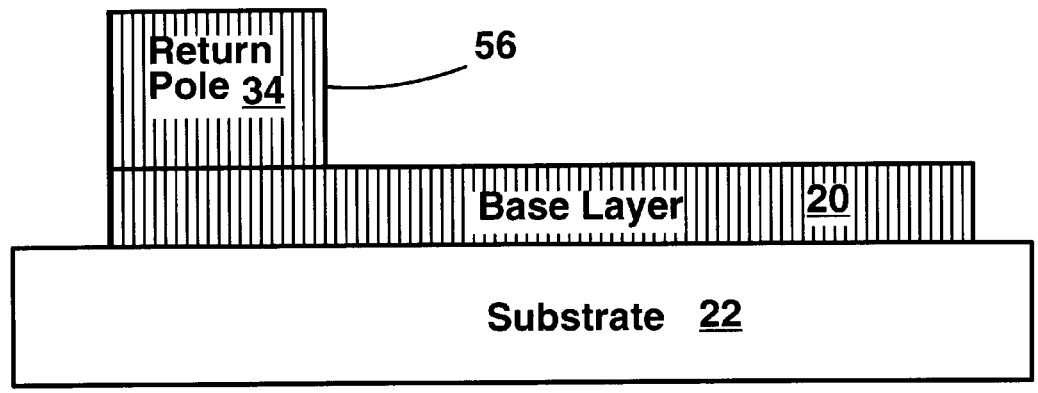

Next, in FIG. 5B, the return pole is deposited and patterned. The return pole is made of a ferromagnetic material such as NiFe alloy. Preferably, the return pole has vertical sidewalls 56 which are perpendicular to the surface of the substrate and base layer. The return pole 34 can be fabricated by masking the base layer and then electroplating the return pole material. The return pole can be about 40–50 microns tall and about 40 by 40 microns square. The interface between the base layer and return pole should be clean and free of insulating materials so that the return pole is magnetically coupled to the base layer.

Figure 5C:
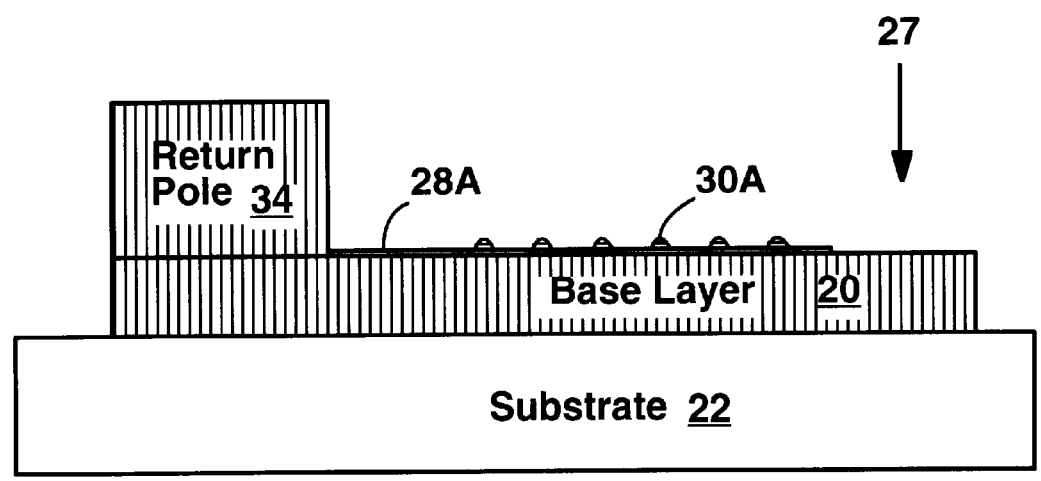

The next step, in FIG. 5C, is to deposit the bottom insulating layer 28A and the bottom half of coil 30A. The bottom half of coil 30A is electrically insulated from the base layer 20 by the bottom insulating layer 28A. The bottom half of coil 30A comprises conductive lines across the base layer 20 extending in a direction into the page. The bottom insulating layer 28A exposes the first end 27 of the base layer 20.

Figure 5D:
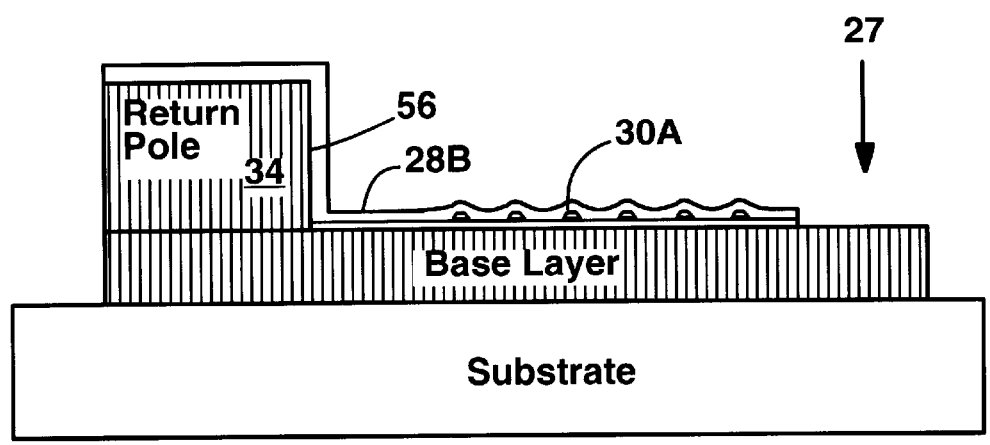

Next, in FIG. 5D, the top insulating layer 28B is deposited over the bottom half of coils 30A and on the sidewall 56 of the return pole 34. The bottom half of coils 30A is thus fully insulated. Coil ends (31, shown in FIG. 2) are not covered by the top insulating layer 28B so that they can be electrically connected to the top half of coils 30B. The top insulating layer 28B also leaves the first end 27 of the base layer 20 uncovered. The thickness of the top insulating layer 28B on the sidewall 56 is accurately controlled. The thickness of the layer 28B on the sidewall eventually determines the gap spacing 44 (of FIG. 1) between the read/write pole 40 (of FIG. 1) and return pole 34. Therefore, for an accurate gap spacing 44, the layer 28B should have an accurate thickness. The insulating material used for the bottom and top insulating layers 28A, 28B can be silicon dioxide, alumina or similar materials. The top insulating layer 28B can be conformally coated on horizontal and vertical surfaces using well known chemical vapor deposition (CVD) techniques. Alternatively, bottom insulating layer 28A can be conformally coated on the sidewall 56 such that the gap spacing 44 is determined by the thickness of the bottom insulating layer 28A.

Figure 5E:
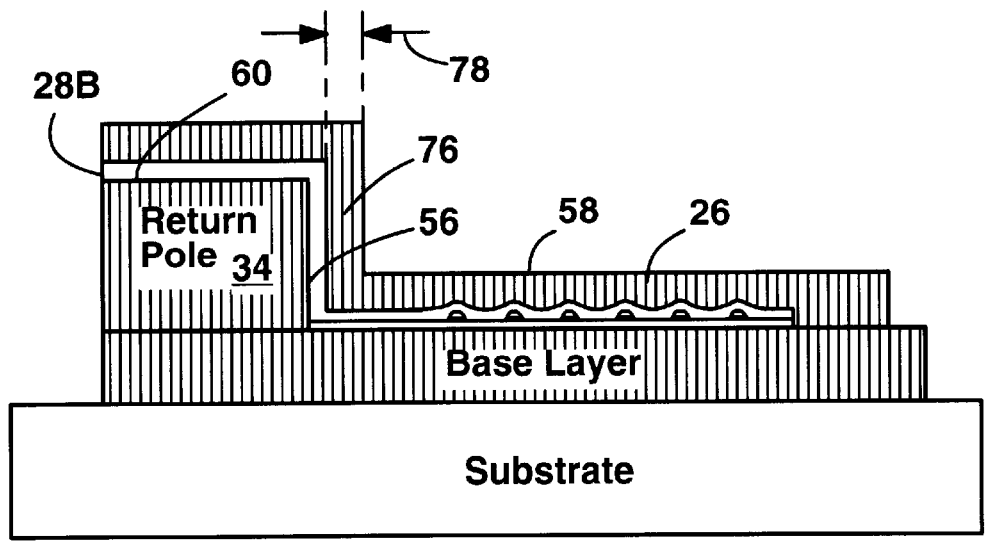

Next, in FIG. 5E, the core layer 26 is deposited on top of the top insulating layer 28B and the magnetic material layer 76 is conformally coated on the inclined surface of the top insulating layer 28B in the region of the sidewall 56. The magnetic material layer 76 is therefore parallel with the sidewall 56. Preferably, the core layer 26 and magnetic material layer 76 comprise a continuous layer of magnetic material. The core layer 26 is magnetically coupled to the first end 27 of the base layer 20. A top surface 58 of the core layer 26 must be lower than a deposited top surface 60 of the return pole 34. The deposited top surface 60 is not necessarily the same surface as the top return pole surface 46, shown in FIGS. 1 and 2. The thickness of the magnetic material layer 76 on the sidewall 56 is accurately controlled. The thickness 78 of the magnetic material layer 76 on the sidewall 56 eventually determines the thickness 80 of the read/write pole 40 (of FIG. 1) . Therefore, for an accurate read/write pole thickness, the magnetic material layer 76 should have an accurate thickness 78.

Figure 5F:
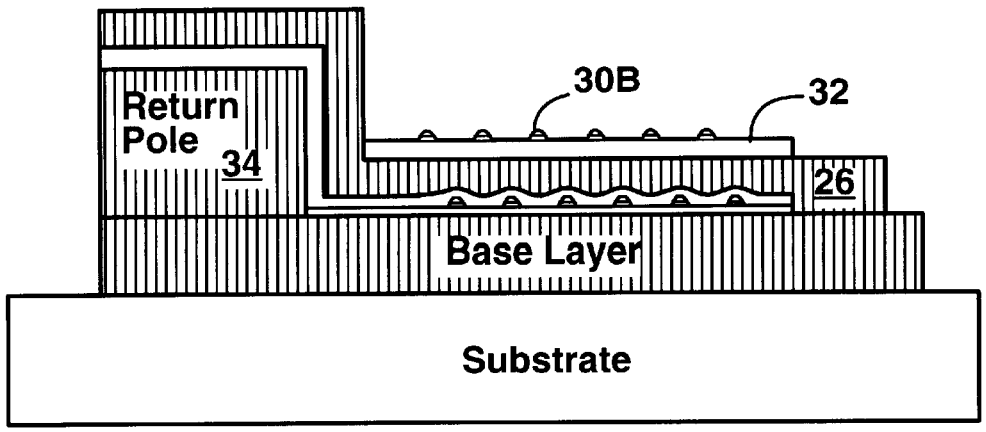

Next, in FIG. 5F, the upper insulating layer 32 and the top half of coil 30B are deposited on top of the core layer 26.

The top half of coil 30B is electrically connected with the bottom half of coil 30A to form a solenoidal winding wound around the core layer 26.

Figure 5G:
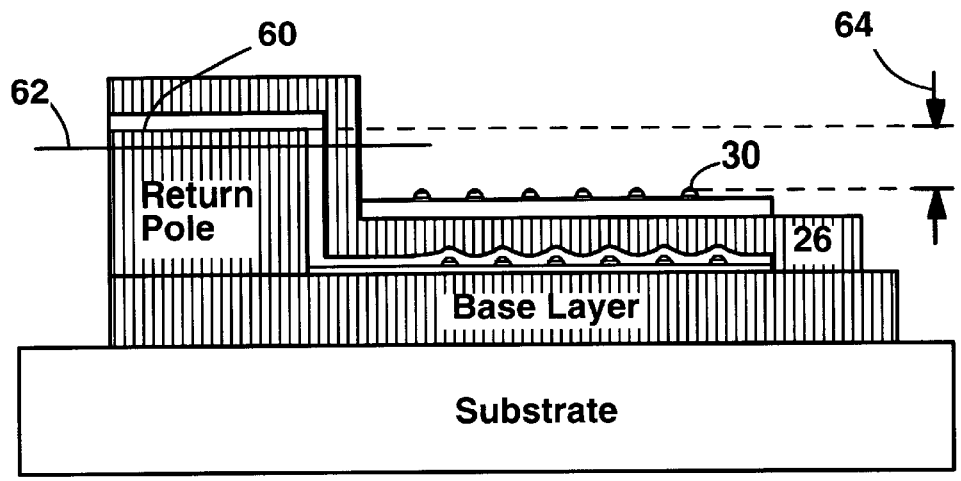

In the final step of FIG. 5G, the head is planarized at a predetermined planarization plane 62. The planarization plane 62 can be located within a range 64 defined by the deposited top surface 60 and the highest point (coil 30) on top of the core layer 26. The planarization plane is parallel with the substrate 22. The planarization plane 62 intersects the magnetic material layer 76 in a region where the magnetic material layer 76 is parallel with the sidewall 56. Therefore, the planarization plane intersects the magnetic material layer 76 perpendicularly or at an inclined angle with respect to the magnetic material layer 76. Also, the planarization plane 62 must not intersect any coils 30. The resultant device after planarization is shown in FIG. 1. The thickness 78 of the magnetic material layer 76 on the sidewall 56 determines the thickness of the read/write head 40 (of FIG. 1).

Figure 6:
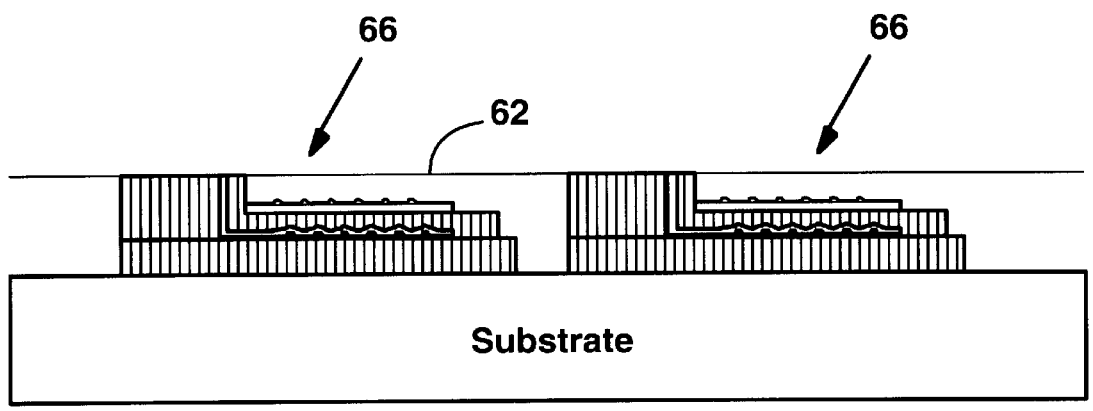
FIG. 6 is a side view illustrating how two heads can be planarized simultaneously.

FIG. 6 illustrates the planarization step being performed on two heads 66 simultaneously. One advantage of the present invention is that the planarization step of FIG. 5G can be performed on a large number of heads 66 simultaneously if the heads 66 are fabricated on a single substrate 22. The heads do not need to be separated before the final planarization step of FIG. 5G. Such batch planarization simplifies the process of manufacturing the heads of the present invention.

Figure 7:
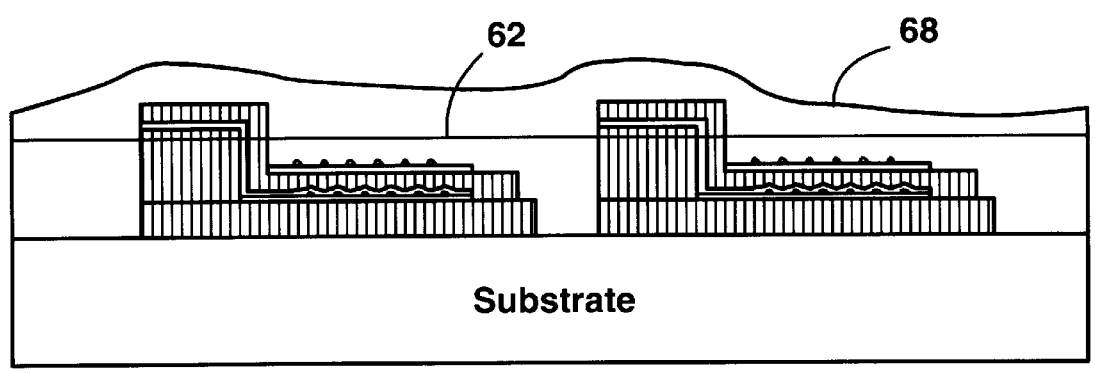
FIG. 7 is a side view showing the heads covered with a passivation layer.
Figure 8:
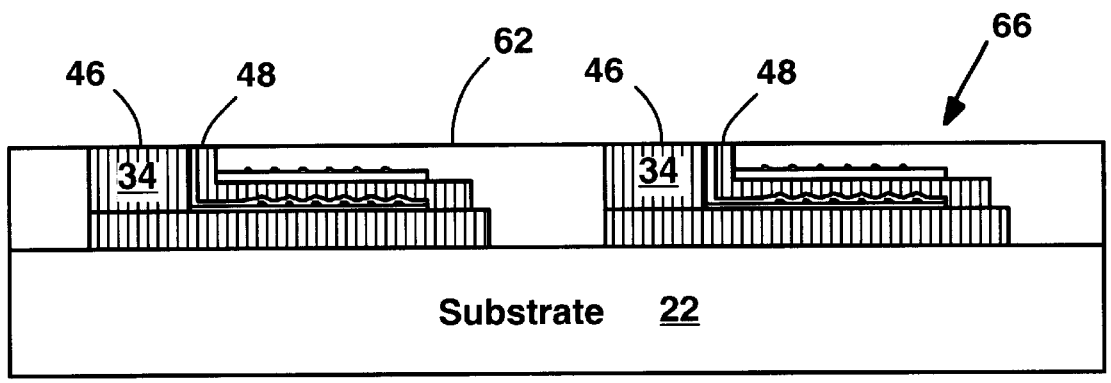
FIG. 8 is a side view showing how the passivation layer can be planarized simultaneously with planarizing the heads.

An alternative shown in FIG. 7 uses a passivation layer 68 coated over the heads 66 before planarization. The resulting heads 66 are shown in FIG. 8. A passivation layer can protect the heads 66 while still allowing the top read/write surface 48 and top return pole surface 46 to interact with a magnetic data storage layer. The top read/write surface 48 and top return pole surface 46 are coplanar with the top surface of the planarized passivation layer 68. The passivation layer 68 can comprise spin-on glass, for example.

Figure 9:
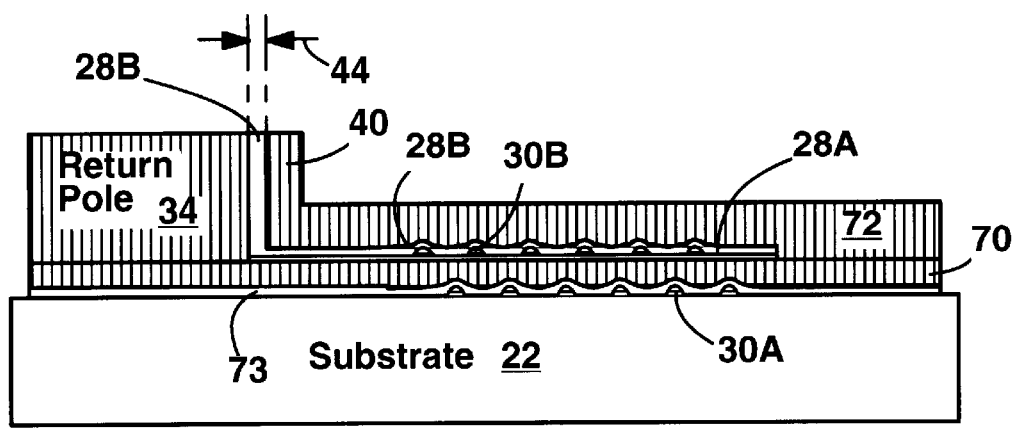
FIG. 9 is a side view of an alternative embodiment of the present invention which locates a core layer and coil underneath a top layer.

An alternative embodiment of the present invention is shown in FIG. 9. The coil 30 is wound around a buried core layer 70, which is located under a top layer 72 of magnetic material. Insulating layers 73, 28 insulate the coil 30 from the buried core layer 70 and top layer 72. This embodiment is not preferred compared to the embodiment of FIGS. 1, 2 and 3 because more layers must be deposited on top of the coil 30, which presents a corrugated surface for depositing subsequent layers. Depositing continuous layers on top of corrugated surfaces can cause continuity problems in subsequently deposited layers. These continuity problems can reduce device yield or require additional planarization steps.

In the apparatus of FIG. 9, the top layer 72 is magnetically coupled to the first end 27 of the buried core layer 70 and the return pole 34 is magnetically coupled to the second end 37 of the buried core layer 70. Preferably, the top layer 72 and the read/write pole 40 comprise a continuous layer of magnetic material. A magnetic circuit exists through the return pole 34, buried core layer 70, top layer 72 and read/write pole 40. The buried core layer and top layer are made of a ferromagnetic material and the insulating layers 28, 73 are made of an insulating material such as silicon dioxide or alumina.

The apparatus of FIG. 9 can be made by a method in which the bottom half of coil 30A and insulating layer 73 are deposited first on top of the substrate 22. Then, the buried core layer 70 is deposited and the return pole 34 is deposited on top of the buried core layer 70. Next, the bottom insulating layer 28A is deposited, the top half of coil 30B is deposited, the top insulating layer 28B is deposited and the top layer 72 is deposited on top of the insulating layer 28B. Preferably, the top layer 72 and the read/write pole 40 are deposited in the same step and so comprise a continuous layer of magnetic material. Finally, the return pole 34, insulating layer 28B (which defines the gap spacing 44) and read/write pole 40 are planarized in the same manner as shown in FIG. 5G. Alternatively, the gap spacing 44 can be defined by bottom insulating layer 28A, or by both bottom and top insulating layers 28A, 28B.

Figure 10:
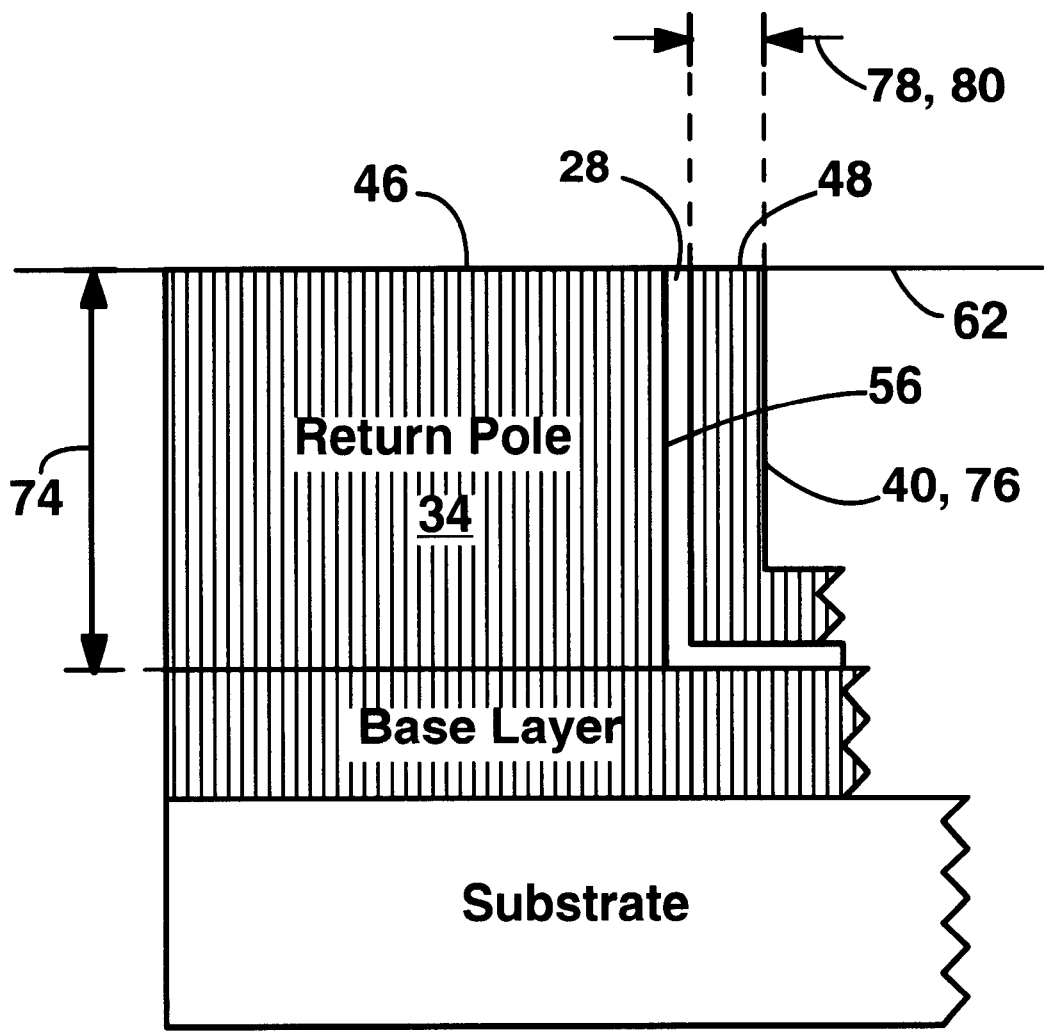
FIG. 10 is a closeup side view of a return pole and read/write pole according to the present invention.

FIG. 10 shows a closeup view of the return pole and read/write pole according to the present invention. The return pole 34 has a sidewall 56 of a predetermined height 74. Preferably, the sidewall 56 is perpendicular to the substrate 22. The read/write pole 40 comprises the magnetic material layer 76 which is adhered to the insulating layer 28 which is adhered to the sidewall 56. The magnetic material layer 76 is therefore perpendicular to the substrate 22. The planarization plane 62 defined by the top return pole surface 46 and top read/write pole surface 48 intersects the magnetic material layer 76 perpendicularly. The thickness 78 of the magnetic material layer 76 should be smaller than the height 74 of the sidewall. This assures that the thickness 80 of the read/write pole 40 is determined by the thickness 78 of the magnetic material layer 76. Therefore, if the magnetic material layer 76 has an accurate thickness 78, then the read/write pole 40 will have accurate thickness 80. Alternatively, the sidewall 56, insulating layer 28, and magnetic material layer 76 can be oriented at an inclined, nonperpendicular angle with respect to the substrate.

Figure 11:
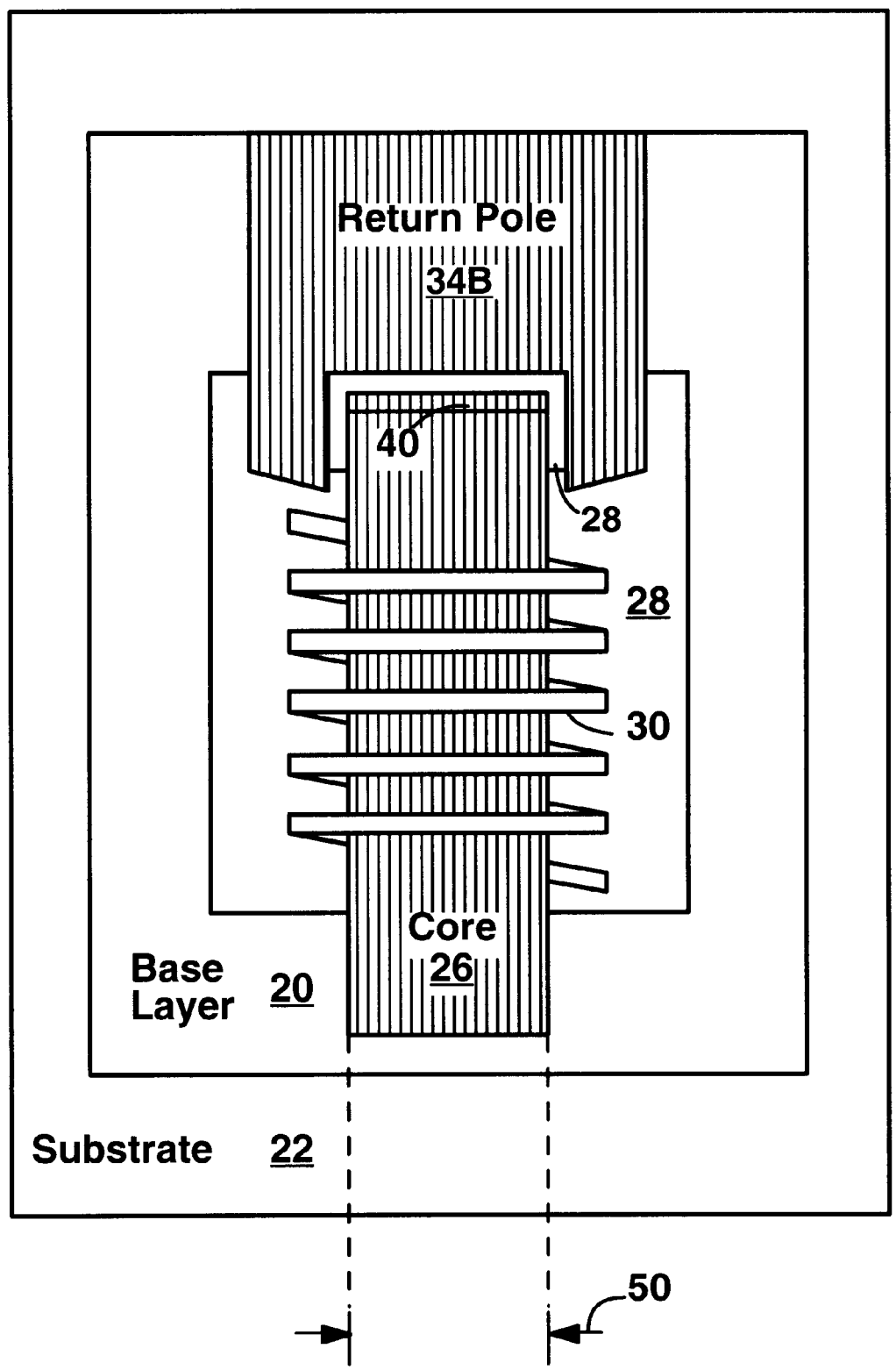
FIG. 11 is a top view showing an embodiment of the present invention which has a U-shaped return pole which surrounds the read/write pole on three sides.

An alternative embodiment is shown in the top view of FIG. 11. The return pole 34B has a U-shape which allows it to surround the read/write pole 40 on three sides. This can improve the performance of the magnetic head.

Figure 12:
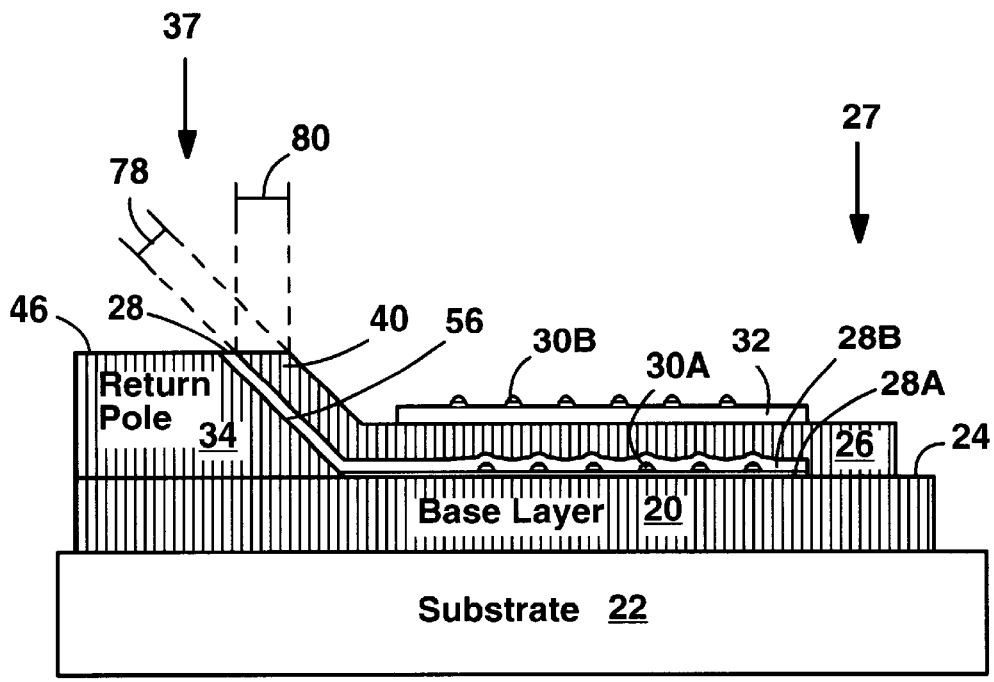
FIG. 12 is a side view showing an embodiment of the present invention in which a sidewall, an insulating layer, and the read/write pole are inclined nonperpendicularly with respect to the substrate.

Another alternative embodiment of the present invention is shown in FIG. 12. Here, the read/write pole 40, insulating layer 28, and sidewall 56 are substantially inclined with respect to the substrate 22, but not perpendicular to the substrate. Such an inclined geometry may render the head more easily manufacturable because depositing the magnetic material layer 76 comprising the read/write pole 40 and the insulating layer may be simplified. Since the sidewall 56 is not perpendicular to the substrate 22, the read/write pole thickness 80 is not equal to the magnetic material thickness 78. The read/write pole thickness 80 will be greater than the magnetic material layer thickness 78.

However, it is preferable to have the sidewall 56, insulating layer 28, and read/write pole 40 perpendicular to the substrate 22, as shown in FIG. 1.

Figure 13:
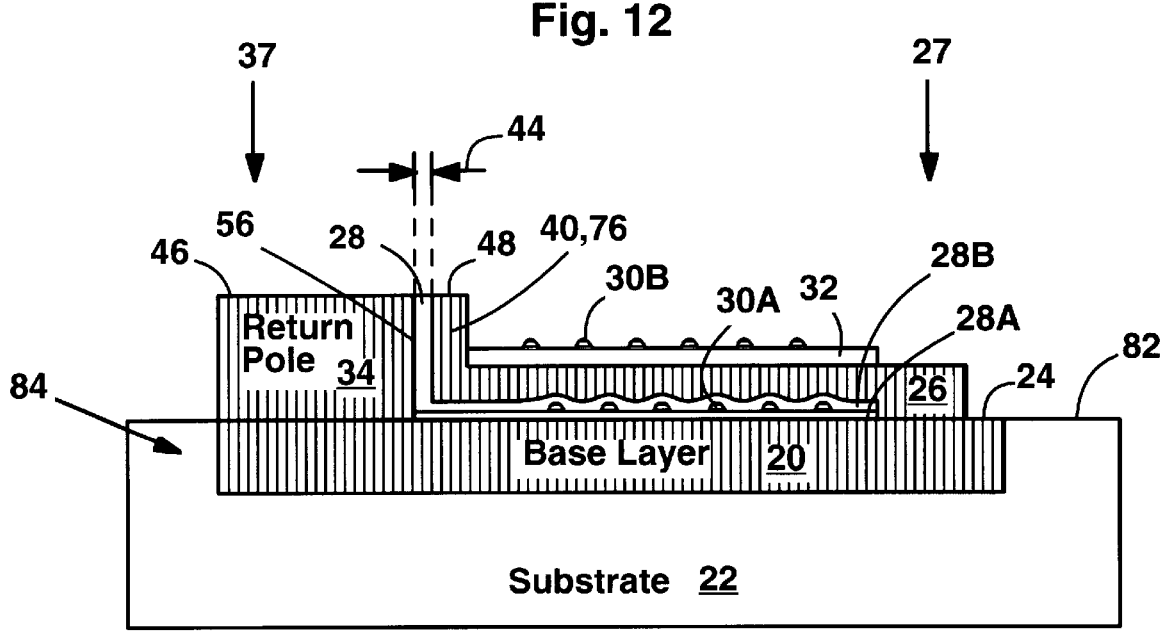
FIG. 13 is a side view showing an embodiment of the present invention in which a base layer is disposed in a V-groove in the substrate

FIG. 13 shows another embodiment of the present invention in which the base layer 20 is disposed in a V-groove 84 cut into the substrate 22. The top surface 24 of the base layer 20 is flush with a top surface 82 of the substrate 22. The V-shape of the V-groove 84 cannot be seen in FIG. 13 because the view is perpendicular to the orientation of the V-groove 84.

Figure 14:
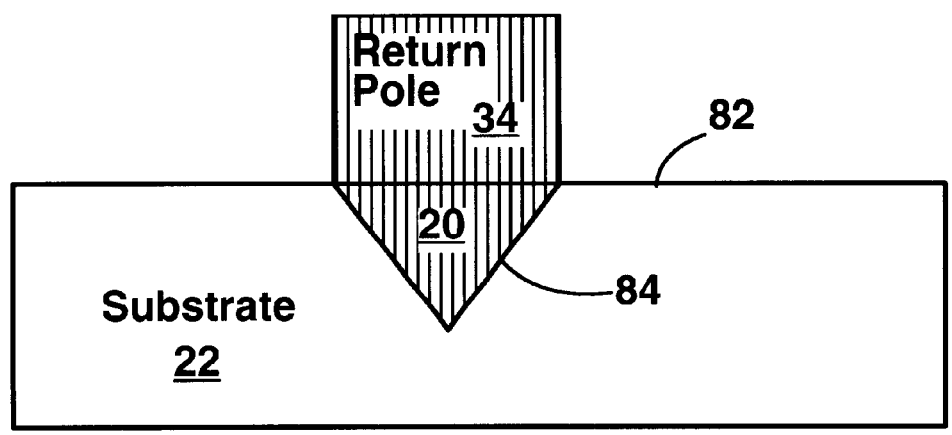
FIG. 14 is a rotated side view of the embodiment of FIG. 13.

FIG. 14 shows a rotated view of the apparatus of FIG. 13 in which the V-shape of the V-groove 84 can be seen. The return pole 34 is disposed on top of the base layer 20. The core layer 26, read/write pole 40 and coil 30 cannot be seen in FIG. 14 because they are behind the return pole 34.

Figure 15A:
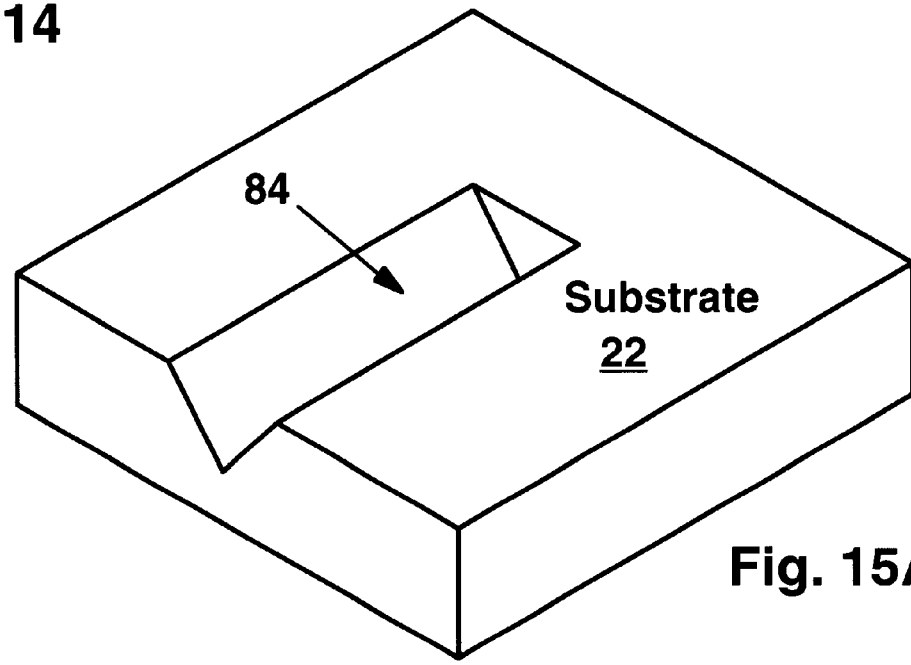
FIGS. 15A–15D illustrate a method for making the base layer disposed in the V-groove.

A first step in manufacturing the head of FIGS. 13 and 14 is shown in FIG. 15A. The V-groove 84 is etched in the substrate 22. Preferably, the substrate 22 is made of silicon having a <100> top surface 24 and the V-groove 84 is etched using an anisotropic etch such as potassium hydroxide.

Figure 15B:
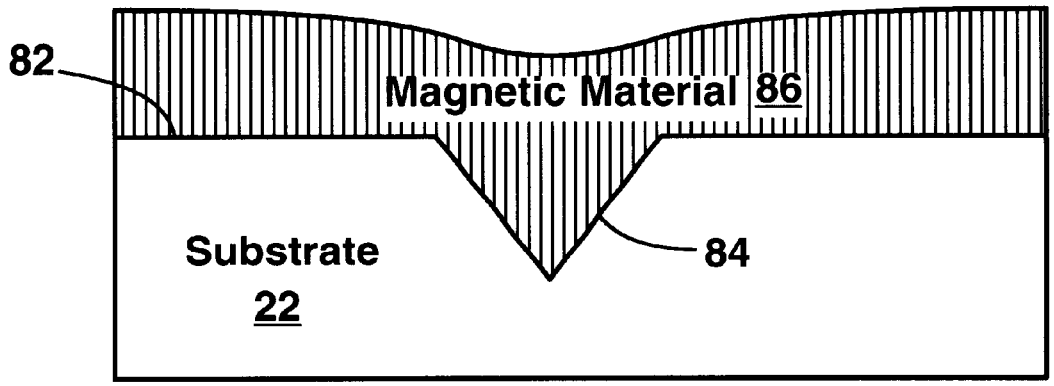

Next, in FIG. 15B, a magnetic material 86 is deposited into the V-groove 84. The magnetic material 86 should completely fill the V-groove 84 past the plane defined by the top surface 24 of the substrate 22. The magnetic material 86 can be deposited into the V-groove 84 using well known sputtering or electroplating techniques.

Figure 15C:
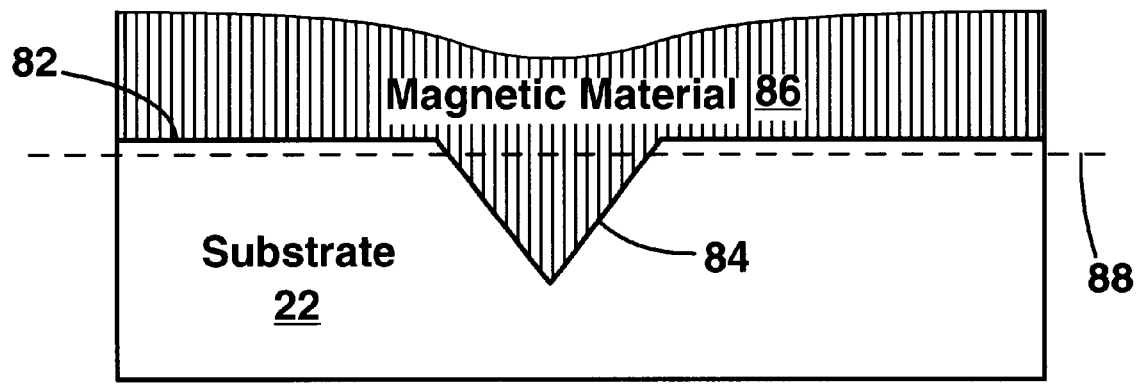
Figure 15D:
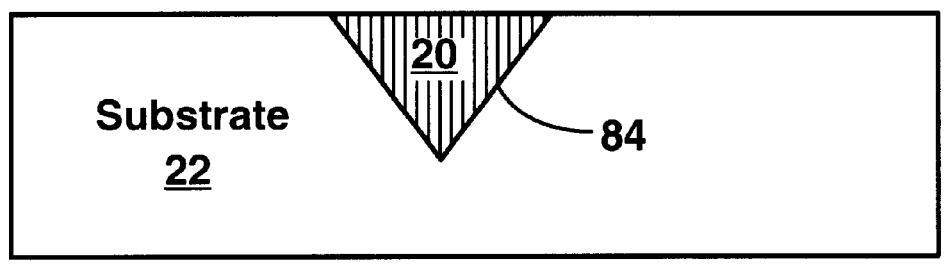

Next, as shown in FIG. 15C, the surface is planarized to a planarization plane 88 slightly below the top surface 82 of the substrate 22. The resulting structure after planarization is shown in FIG. 15D. The remaining magnetic material fills the V-groove 84. The magnetic material remaining in the V-groove 84 comprises the base layer 20 of FIG. 13. The return pole 34, coil 30, insulating layer 28, core layer 26, and magnetic material layer can then be deposited on top of the base layer 20 in the same manner illustrated in FIGS. 5A–5G.

Figure 16:
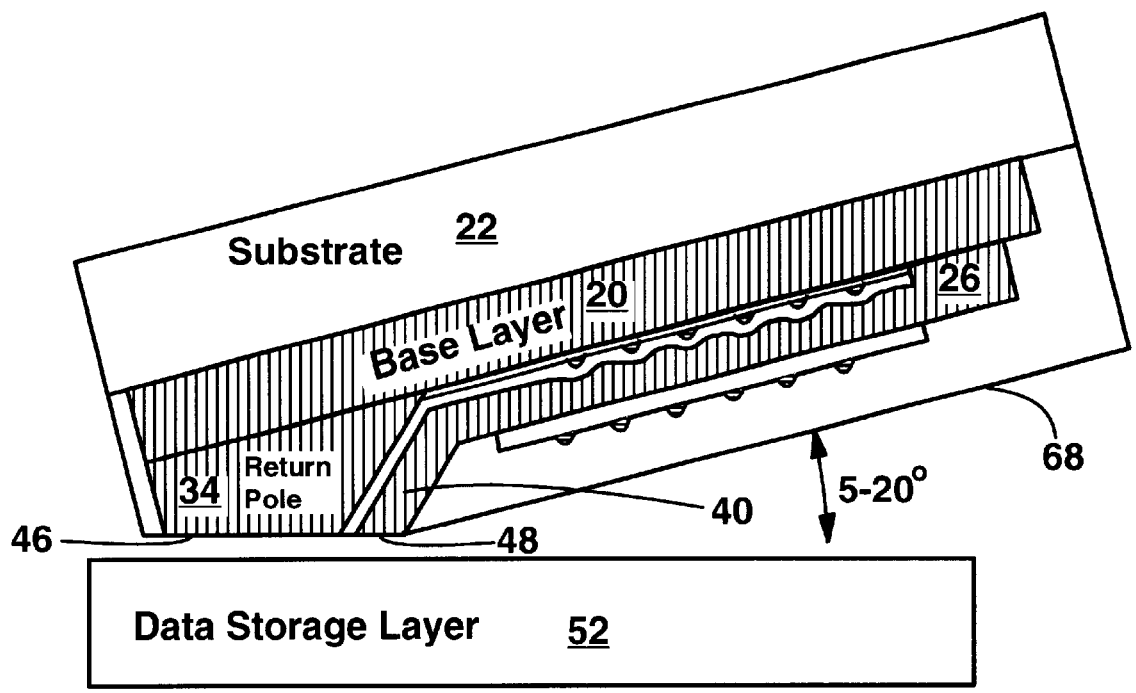
FIG. 16 shows a preferred embodiment where the head is lapped at an angle with respect to the substrate to provide air bearing flotation for hard drive applications.

FIG. 16 shows an embodiment of the present invention useful for hard drive applications where the head must be supported above the data storage layer by air bearing forces. Here, the return pole 34 and core layer 26 are lapped an angle with respect to the substrate. The top read/write pole surface 48 and top return pole surface 46 are disposed at an angle with respect to the substrate. This allows the passivation layer 68 to serve as an air bearing surface. Alternatively, the substrate 22 can serve as an air bearing surface. It may be preferable for the device to be designed so that the read/write pole 40 is perpendicular to the data storage layer 52. Preferably, the device is designed so that the top surfaces 46, 48 are inclined at an angle in the range of about 5–20 degrees (angles within this range are commonly used for air bearing surfaces).

The present invention provides a magnetic read/write head which has a reduced footprint size compared to prior art devices. This allows more heads to be manufactured per unit surface area on a substrate, which reduces costs and allows the heads to be located close together. Locating heads close together can reduce track pitch on a magnetic data storage medium, which can increase the data density. Also, the heads of the present invention can be batch-planarized parallel with the substrate, which reduces the cost of manufacture.

It will be clear to one skilled in the art that the above embodiment may be altered in many ways without departing from the scope of the invention. Accordingly, the scope of the invention should be determined by the following claims and their legal equivalents.

What is claimed is:

1. A thin film magnetic read/write head comprising:
    a) a substrate;
    b) a base layer of magnetic material disposed on the substrate, the base layer having a first end and a second end;
    c) a core layer of magnetic material disposed on the base layer and substantially parallel with the base layer such that a first end of the core layer is magnetically coupled with the first end of the base layer;
    d) a coil of electrically conductive material disposed around the core layer;
    e) a return pole of magnetic material disposed adjacent to a second end of the care layer and on the second end of the base layer, wherein the return pole is magnetically coupled with the second end of the base layer,
    f) a read/write pole disposed adjacent to the return pole and magnetically coupled to the second end of the core layer, wherein the read/write pole is substantially inclined with respect to the substrate and wherein a top read/write pole surface is coplanar with a top return pole surface; and
    g) an insulating layer disposed between the return pole and the read/write pole, wherein the layer is substantially inclined with respect to the substrate and defines a gap spacing between the return pole and read/write pole;
    wherein the surface area of the top surface of the return pole is larger than the surface area of the top surface of the read/write pole.

2. A thin film magnetic read/write head comprising:
    a) a substrate;
    b) a base layer of magnetic material disposed on the substrate, the base layer having a first end and a second end;
    c) a core layer of magnetic material disposed on the base layer and substantially parallel with the base layer such that a first end of the core layer is magnetically coupled with the first end of the base layer,
    d) a coil of electrically conductive material disposed around the core layer;
    e) a return pole of magnetic material disposed adjacent to a second end of the core layer and on the second end of the base layer, wherein the retain pole is magnetically coupled with the second end of the base layer;
    f) a read/write pole disposed adjacent to the return pole and magnetically coupled to the second end of the core layer, wherein the read/write pole is substantially inclined with respect to the substrate, and wherein a top read/write pole surface is coplanar with a top return pole surface, and when the read/write pole has a width narrower than the return pole; and
    g) an insulating layer disposed between the return pole and the read/write pole, wherein the layer is substantially inclined with respect to the substrate and defines a gap spacing between the return pole and read/write pole.

3. A thin film magnetic read/write head comprising:
    a) substrate;
    b) a base layer of magnetic material disposed; on the substrate, the base layer having a first end and a second end;
    c) a core layer of magnetic material disposed on the base layer and substantially parallel with the base layer such that a first end of the core layer is magnetically coupled with the first end of tho base layer;
    d) a coil of electrically conductive material disposed around the core layer;
    e) a return pole of magnetic material disposed adjacent to a second end of the core layer and on the second end of the base layer, wherein the return pole is magnetically coupled with the second end of the base layer;
    f) a read/write pole disposed adjacent to the return pole and magnetically coupled to the second end of the core layer, wherein the read/write pole is substantially inclined with respect to the substrate and wherein a top red/write pole surface is coplanar with a top return pole surface and wherein the top read/write pole surface and top return pole surface are inclined at an angle with respect to the substrate; and
    g) an insulating layer disposed between the return pole and the read/write pole, wherein the layer is substantially inclined with respect to the substrate and defines a gap spacing between the return pole and read/write pole.

4. A thin film magnetic read/write head comprising:
a) substrate;
b) a base layer of magnetic material disposed on the substrate, the base layer having a first end and a second end;
c) a core layer of magnetic material disposed on the base layer and substantially parallel with the base layer such that a first end of the core layer is magnetically coupled with the first end of the base layer;
d) a coil of electrically conductive material disposed around the core layer;
e) a return pole of magnetic material disposed adjacent to a second end of the core layer and on the second end of the base layer, wherein the return pole is magnetically coupled with the second end of the base layer;
f) a read/write pole disposed adjacent to the return pole and magnetically coupled to the second end of the core layer, wherein the read/write pole is substantially inclined with respect to the substrate and wherein a top read/write pole surface is coplanar with a top return pole surface and wherein the top read/write pole surface and top return pole surface are inclined at an angle in the range of 5–20 degrees with respect to the substrate; and
g) an insulating layer disposed between the return pole and the read/write pole, wherein the layer is substantially inclined with respect to the substrate and defines a gap spacing between the return pole and read/write pole.

5. A thin film magnetic read/write head comprising:
a) a substrate;
b) a buried core layer of magnetic material disposed on the substrate, the buried core layer having a first end and a second end;
c) a coil of electrically conductive material disposed around the buried core layer;
d) a top layer of magnetic material disposed on the buried core layer and coil such that a first end of the top layer is magnetically coupled with a first end of the buried core layer;
e) a return pole of magnetic material disposed adjacent to a second end of the top layer and on the second end of the buried core layer, wherein the return pole is magnetically coupled with the second end of the buried core layer;
f) a read/write pole disposed adjacent to the return pole and magnetically coupled to the second end of the top layer; wherein the read/write pole is substantially inclined with respect to the substrate, and wherein a top surface of the read/write pole is coplanar with a top surface of the return pole; and
g) an insulating layer disposed between the return pole and the read/write pole, wherein the layer is substantially inclined with respect to the substrate and defines a gap spacing between the return pole and the read/write pole;
wherein the top return pole surface is larger than the top read/write pole surface.

6. A thin film magnetic read/write head comprising:
a) a substrate;
b) a buried core layer of magnetic material disposed on the substrate, the buried core layer having a first end and a second end;
c) a coil of electrically conductive material disposed around the buried core layer;
d) a top layer of magnetic material disposed on the buried core layer and coil such that a first end of the top layer is magnetically coupled with a first end of the buried core layer;
e) a return pole of magnetic material disposed adjacent to a second end of the top layer and on the second end of the buried core layer, wherein the return pole is magnetically coupled with the second end of the buried core layer;
f) a read/write pole disposed adjacent to the return pole and magnetically coupled to the second end of the top layer, wherein the read/write pole is substantially inclined with respect to the substrate, and wherein a top surface of the read/write pole is coplanar with a top surface of the return pole and wherein the read/write pole has a width which is narrower than the return pole; and
g) an insulating layer disposed between the return pole and the read/write pole, wherein the layer is substantially inclined with respect to the substrate and defines a gap spacing between the return pole and the read/write pole.

7. A thin film magnetic read/write head comprising:
a) a substrate;
b) a buried core layer of magnetic material disposed on the substrate, the buried core layer having a first end and a second end;
c) a coil of electrically conductive material disposed around the buried core layer;
d) a top layer of magnetic material disposed on the buried core layer and coil such that a fist end of the top layer is magnetically coupled with a fist end of the buried core layer,
e) a return pole of magnetic material disposed adjacent to a second end of the top layer and on the second end of the buried core layer, wherein the return pole is magnetically coupled with the second end of the buried core layer;
f) a read/write pole disposed adjacent to the return pole and magnetically coupled to the second end of the top layer, wherein the read/write pole is substantially inclined with respect to the substrate, and wherein a top surface of the read/write pole is coplanar with a top surface of the return pole and wherein the top read write pole surface and top return pole surface are inclined at an angle with respect to the substrate; and
g) an insulating layer disposed between the return pole and the read/write pole, wherein the layer is substantially inclined with respect to the substrate and defines a gap spacing between the return pole and the read/write pole.

8. A thin film magnetic read/write head comprising:
a) a substrate;
b) a return pole attached to the substrate and having a top return pole sure and a sidewall substantially inclined with respect to the substrate;
c) and insulating layer disposed on the sidewall, wherein the thickness of the insulating layer determines a gap spacing; and
d) a read/write pole comprising a magnetic material disposed on the insulating layer such that the read/write pole is parallel with the sidewall, wherein:
  1) the read/write pole bas a top read/write pole surface coplanar with the top return pole surface;
  2) the plane defined by the top return pole surface is inclined with respect to the magnetic material layer;

3) the read/write pole has a thickness which is smaller than the height of the sidewall; and
4) the top return pole surface and top read/write pole surface are inclined at an angle of 5–20 degrees with the respect to the substrate.

9. A thin film magnetic read/write head comprising:

a) a substrate;

b) a return pole attached to the substrate and having a top return pole surface and a sidewall substantially inclined with respect to the substrate;

c) and insulating layer disposed on the sidewall, wherein the thickness of the insulating layer determines a gap spacing; and d) a read/write pole comprising a magnetic material disposed on the insulating layer such that the read/write pole is parallel with the sidewall, wherein:
1) the read/write pole has a top read/write pole surface coplanar with the top return pole surface;
2) the plane defined by the top return pole surface is inclined with respect to the magnetic material layer;
3) the read/write pole has a thickness which is smaller than the height of the sidewall; and
4) the top return pole surface and the top read/write pole surface are inclined at an angle in the range of 5–20 degrees with respect to the substrate.

* * * * *